(12) United States Patent
Tanabe et al.

(10) Patent No.: US 11,144,603 B2
(45) Date of Patent: Oct. 12, 2021

(54) FUSION CONDITION PROVIDING SYSTEM

(71) Applicant: FURUKAWA ELECTRIC CO., LTD., Tokyo (JP)

(72) Inventors: Akio Tanabe, Tokyo (JP); Kazunori Yamamoto, Tokyo (JP); Hirofumi Oshima, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 287 days.

(21) Appl. No.: 16/194,004

(22) Filed: Nov. 16, 2018

(65) Prior Publication Data
US 2019/0102347 A1 Apr. 4, 2019

Related U.S. Application Data

(63) Continuation of application No. PCT/JP2017/018329, filed on May 16, 2017.

(30) Foreign Application Priority Data

May 17, 2016 (JP) .............................. JP2016-098869

(51) Int. Cl.
*G06F 16/953* (2019.01)
*G02B 6/255* (2006.01)
*G06F 16/16* (2019.01)

(52) U.S. Cl.
CPC .......... *G06F 16/953* (2019.01); *G02B 6/255* (2013.01); *G02B 6/2553* (2013.01); *G06F 16/16* (2019.01)

(58) Field of Classification Search
CPC ...... G06F 16/953; G06F 16/16; G02B 6/2553
See application file for complete search history.

(56) References Cited

U.S. PATENT DOCUMENTS 6,206,583 B1 3/2001 Hishikawa et al.
6,464,410 B1 10/2002 Sahinci et al.
(Continued)

FOREIGN PATENT DOCUMENTS

JP H10-282358 A 10/1998
JP 2003-287643 A 10/2003
(Continued)

OTHER PUBLICATIONS

English translation of Written Opinion (PCT/ISA/237) issued in PCT/JP2017/018329 dated Aug. 2017.
(Continued)

*Primary Examiner* — Vaishali Shah
(74) *Attorney, Agent, or Firm* — Chen Yoshimura LLP

(57) ABSTRACT

A fusion condition providing system for an optical fiber fusion splicer includes: a storage device storing a database of fusion conditions; a user-side communication unit transmitting a command for requesting a fusion condition for a pair of optical fibers to be fusion spliced by a user's fusion splicer; and a data management unit. The data management unit, in accordance with the command received from the user-side communication unit via a network, transmits the requested fusion condition among the plurality of fusion conditions inside the storage device to the user-side communication unit via the network so that the requested fusion condition is available for use in the fusion splicer. If the requested fusion condition was not in the database, the data management unit updates the database by causing the requested fusion condition to be newly created and storing the newly created fusion condition in the database.

11 Claims, 6 Drawing Sheets

(56) References Cited

U.S. PATENT DOCUMENTS

| | | | |
|---|---|---|---|
| 6,478,482 B1 | 11/2002 | Sahinci et al. | |
| 6,676,307 B1 | 1/2004 | Yang et al. | |
| 6,771,904 B1* | 8/2004 | Sasaki | H04B 10/0775 |
| | | | 398/16 |
| 7,937,414 B2 | 5/2011 | Thornton et al. | |
| 2004/0047572 A1* | 3/2004 | Hattori | G02B 6/2555 |
| | | | 385/96 |
| 2007/0081772 A1 | 4/2007 | Mendel et al. | |
| 2011/0309056 A1* | 12/2011 | Zheng | G02B 6/2551 |
| | | | 219/121.11 |
| 2017/0351691 A1* | 12/2017 | Li | G06F 16/00 |
| 2019/0028532 A1* | 1/2019 | Lee | H04W 84/20 |

FOREIGN PATENT DOCUMENTS

| | | |
|---|---|---|
| JP | 2004-198977 A | 7/2004 |
| JP | 2004-246073 A | 9/2004 |
| JP | 2010-128290 A | 6/2010 |

OTHER PUBLICATIONS

International Search Report (ISR) issued in PCT/JP2017/018329 dated Aug. 2017.
Written Opinion (PCT/ISA/237) issued in PCT/JP2017/018329 dated Aug. 2017.

\* cited by examiner

| Functional Part of Fusion Splicer | Microscope Part | Axis Alignment Mechanism | Heating Device | Feed Mechanism |
|---|---|---|---|---|
| Parameter | Optical Fiber Diameter | Passing-light Wavelength | Initial Heating Temperature | Feed Start Time |
| | Optical Fiber Core Diameter | Optical Fiber Cross-sectional Structure | Molding Heating Temperature | Feed Distance |
| | Optical Fiber Cross-sectional Structure | | Heating Time | Feed Speed |

FIG. 2

| | | | |
|---|---|---|---|
| Parameter Type (Required) | Applied Model (Required) | | Search — 140 |
| Fusion Condition — 101 | Type ○○ — 102 | | |

| 111 Wavelength (nm) | 112 Splicing Type | Rev |
|---|---|---|
| 1310 | Differing Type Fibers | 1 |

| 121 Maker Name | 122 Sleeve Length (mm) | 123 Maker Model Number |
|---|---|---|
| Maker F | 40 | × × × |

| | 131a Maker | 131b Product Name / Type |
|---|---|---|
| Fiber Information 1 | Maker A | Product Name ○X / Type XX |
| Fiber Information 2 | Maker B — 132a | Product Name △○ / Type △△ — 132b |

Comments

| Parameter Set Number | | #1 | #2 | ... |
|---|---|---|---|---|
| Index Information | First Optical Fiber Identifying Information | Maker A Type XX | Maker A Type XX | ... |
| | Second Optical Fiber Identifying Information | Maker A Type XX | Maker B Type ΔΔ | ... |
| | Passing-light Wavelength | 1550nm | 1310nm | ... |
| | Fusion Splicer Identifying Information | Type ○○ | Type ○○ | ... |
| Parameter Set (Fusion Conditions) | Initial Heating Temperature | 2200°C | 2200°C | ... |
| | Molding Heating Temperature | 2200°C | 1900°C | ... |
| | Heating Time | 1 Second | 10 Seconds | ... |
| | Feed Start Time | 0.1 Second | 0.2 Second | ... |
| | ⋮ | ⋮ | ⋮ | ⋮ |

FIG. 4

FUSION CONDITION PROVIDING SYSTEM

BACKGROUND OF THE INVENTION

Technical Field

The present invention relates to a fusion condition providing system.

Background Art

Fusion splicers used for the fusion splicing of optical fibers are conventionally known (e.g., see Patent Document 1). In general, a fusion splicer sequentially performs a position confirming step for confirming positions of the respective ends of two target optical fibers, and an axis aligning step for aligning the central axes (core axes) of the two optical fibers for which position confirmation has been performed. Next, the fusion splicer sequentially performs a heating step for heating and melting the respective ends of the two optical fibers of which the axes have been aligned, and a splicing step for abutting and splicing the respective ends of the two optical fibers that have been heated and melted. Thereafter, the fusion splicer sequentially performs an inspecting step for optically inspecting the fusion spliced portion of these two optical fibers via image processing or the like, and a reinforcing step for mechanically reinforcing the fusion spliced portion via a reinforcing member such as a sleeve. Through this series of steps, from the position confirming step to the reinforcing step, the fusion splicer completes the fusion splicing of the two target optical fibers.

In the series of steps described above performed by the fusion splicer for fusion splicing two optical fibers, automatic control is performed by a control device of the fusion splicer. In other words, in the series of steps performed by the fusion splicer, the control device controls the functional parts of the fusion splicer on the basis of various setting values of the fusion condition required to fusion splice the two target optical fibers. Among such various setting values of the fusion condition, there are setting values that should be changed in accordance with the types of the two optical fibers to be fusion spliced (specifically, physical characteristics such as the material, structure, or dimensions of the optical fibers, which differ depending on the type of optical fiber) or the wavelength of the light passing through the two optical fibers after fusion splicing (hereinafter, referred to as "passing-light wavelength" or "operating wavelength"), etc. Hereinafter, the individual setting values included in a particular fusion condition will be referred to as "parameters," and the group of parameters constituting a fusion condition will be referred to as a "parameter set."

A storage device of the fusion splicer stores a large number of known parameter sets at the time of manufacture or sale of the fusion splicer. The fusion splicer selects a parameter set required for fusion splicing of the two optical fibers from among a large number of parameter sets within the storage device in accordance with the types and passing-light wavelength or the like of the two target optical fibers, and then the fusion condition is switched to the selected parameter set. The fusion splicer, by sequentially performing the series of steps described above on the basis of the fusion condition (parameter set) that has been switched to in this manner, makes it possible to fusion-splice the two target optical fibers with a good finish.

RELATED ART DOCUMENT

Patent Document

Patent Document 1: Japanese Patent Application Laid-Open Publication No. 2010-128290

SUMMARY OF THE INVENTION

In the field of optical fibers, there are a large variety of optical fibers in the market that are distinguished by the purpose or optical characteristics thereof or the physical characteristics thereof such as the diameter of the optical fiber, the core diameter, the material of the core or cladding, or the refractive index distribution in the radial direction, and examples of these optical fibers include single-mode optical fibers, multi-mode optical fibers, polarization holding optical fibers, optical fibers for laser beam transmission, etc. Makers of optical fibers introduce a large number of new types of optical fibers into the market every year. Accordingly, the number of combinations for all optical fibers (i.e., the number of combinations for two optical fibers that are the target of fusion splicing) in the market is enormous and tends to increase every year.

Meanwhile, a fusion splicer used by a user (hereinafter, referred to as the "user's fusion splicer") is preset with a large number of known parameter sets at the time of manufacture or sale thereof. However, it cannot be avoided that the number (number of types) of parameter sets that are preset in the user's fusion splicer is an extremely limited range compared to the number of combinations of all optical fibers, which tends to increase every year as described above. Moreover, in the case where a different type (model) of fusion splicer is used, there are times when a different parameter set in accordance with the model of the fusion splicer is required due to structural differences in the fusion splicers between the various models.

Due to this, if the parameter set adapted for fusion splicing of the two target optical fibers is not preset in the user's fusion splicer, then the user is required to perform a work process such as creating a new parameter set that is adaptable to the fusion splicing via experiments or trial and error, or the store where the user purchased the fusion splicer or the manufactures of the user's fusion splicer is required to perform a work process such as creating a new parameter set that can be adapted to the fusion splicer and providing that new parameter set to the user in response to the request by the user. These types of work processes take considerable time and effort, and thus there was a problem where a considerable amount of time was required from the onset of the necessity of the user requiring a parameter set for fusion splicing to the satisfying of this necessity by providing the requested parameter set to the user.

The present invention was made in view of the foregoing and aims at providing a fusion condition providing system that can provide, as quickly as possible to a user's fusion splicer, a parameter set required for the fusion splicing of the optical fibers desired by the user.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a fusion condition providing system that provides fusion conditions to a fusion splicer that fusion splices optical fibers, the fusion condition providing system including: a user-side communication unit that generates a command for requesting a fusion condition for a pair of optical fibers to be fusion spliced by a fusion splicer used by a user; a storage device storing a database of a plurality of fusion conditions; a new data management unit for creating and managing a new fusion condition that is not in the storage device; a data management unit that controls the storage device and that communicates with the user-side communication unit via a network; wherein the storage device is searched for the fusion condition requested by the user-side communication unit, and if the requested fusion condition exists among the plurality of fusion conditions stored in the storage device, the data management unit retrieves the requested fusion condition from the storage device and transmits the retrieved requested fusion condition to the user-side communication unit via the network so that the retrieved requested fusion condition is available for use in the fusion splicer, wherein, if the requested fusion condition does not exist among the plurality of fusion conditions stored in the storage device, the data management unit transmits a request to newly create the requested fusion condition to the new data management unit, wherein in response to the request to newly create the requested fusion condition, the new data management unit causes the requested fusion condition to be newly created and transmits the newly created fusion condition to the data management unit, and wherein upon receipt of the newly created fusion condition, the data management unit stores the newly created fusion condition in the storage device so as to update the database of the fusion conditions in the storage device, and transmits the newly created fusion condition to the user-side communication unit via the network so that the newly created fusion condition is available for use in the fusion splicer.

Furthermore, in the fusion condition providing system of the present invention, the data management unit may receive the command for requesting the fusion condition from the user-side communication unit and perform the search for the requested fusion condition in the storage device.

Furthermore, in the fusion condition providing system of the present invention, the user-side communication unit may perform the search for the requested fusion condition in the storage device by accessing the storage device via the network, and if the requested fusion condition exists among the plurality of fusion conditions stored in the storage device, the user-side communication unit may cause the data management unit to retrieve the requested fusion condition from the storage device and transmit the retrieved requested fusion condition to the user-side communication unit via the network so that the retrieved requested fusion condition is available for use in the fusion splicer.

Furthermore, in the fusion condition providing system of the present invention, each fusion condition may be a parameter set that is associated with at least types of the optical fibers to be fusion spliced and a model of the fusion splicer to be used for the fusion splicing.

Furthermore, in the fusion condition providing system of the present invention, each fusion condition may be further associated with an operating wavelength that is a wavelength of light passing through the optical fibers after the fusion splicing.

Furthermore, in the fusion condition providing system of the present invention, the user-side communication unit, the new data management unit, and the data management unit may be located remotely from each other and are connected through the network that includes a shared public network.

Furthermore, in the fusion condition providing system of the present invention, the fusion condition providing system may further includes: an optical fiber management unit that manages a plurality of optical fibers that are available for use in newly creating the requested fusion condition by the new data management unit, wherein the data management unit determines whether the requested fusion condition exists in the plurality of fusion conditions stored in the storage device, and if the requested fusion condition does not exist among the plurality of fusion conditions stored in the storage device, the data management unit determines whether the optical fiber management unit indicates that the pair of optical fibers for which the requested fusion condition is to be newly created are available for use, and wherein if the optical fiber management unit does not indicate that the pair of optical fibers are available for use, the data management unit transmits a request to the optical fiber management unit that causes the pair of optical fibers to be available for use in newly creating the requested fusion condition, and wherein, only after confirming that the optical fiber management unit indicates that the pair of optical fibers are available for use in newly creating the requested fusion condition, the data management unit transmits the request to newly create the requested fusion condition to the new data management unit.

Furthermore, in the fusion condition providing system of the present invention, the command for requesting the fusion condition may include index information that indicates at least types of the pair of optical fibers to be fusion spliced by the fusion splicer and a model of the fusion splicer, and the data management unit may receive the command and performs the search for the requested fusion condition in the storage device.

Furthermore, in the fusion condition providing system of the present invention, the command for requesting the fusion condition may further indicate an operating wavelength that is a wavelength of light passing through the optical fibers after the fusion splicing, and the data management unit may receive the command and perform the search for the requested fusion condition in the storage device.

In another aspect, the present disclosure provides a fusion condition server to be installed in a fusion condition providing network system that provides fusion conditions to a fusion splicer that fusion splices optical fibers, the fusion condition server including: a storage device that stores a database of a plurality of fusion conditions; and a data management unit that controls the storage device, wherein the data management unit is configured to receive, via a network, a command generated by a user-side communication unit that is connectable or connected to a fusion splicer used by a user, the command requesting a fusion condition for a pair of optical fibers to be fusion spliced by the fusion splicer, wherein in response to the command, the data management unit performs a search for the requested fusion condition in the storage device, and if the requested fusion condition exists among the plurality of fusion conditions stored in the storage device, the data management unit retrieves the requested fusion condition from the storage device and transmits the retrieved requested fusion condition to the user-side communication unit via the network so that the retrieved requested fusion condition is available for use in the fusion splicer, wherein, if the requested fusion condition does not exist among the plurality of fusion conditions stored in the storage device, the data management unit transmits a new condition request to newly create the requested fusion condition to a new data management unit that is disposed in the fusion condition providing network system, and wherein the data management unit is configured to receive the fusion condition that has been newly created by the new data management unit in response to the new condition request, and store the newly created fusion condition in the storage device so as to update the database of the fusion conditions in the storage device, and the data management unit further transmits the newly created fusion condition to the user-side communication unit via the network so that the newly created requested fusion condition is available for use in the fusion splicer.

In the above-mentioned fusion condition server, each fusion condition may be a parameter set that is associated with at least types of the optical fibers to be fusion spliced and a model of the fusion splicer to be used for the fusion splicing.

In the above-mentioned fusion condition server, each fusion condition may be further associated with an operating wavelength that is a wavelength of light passing through the optical fibers after the fusion splicing.

In the above-mentioned fusion condition server, if the requested fusion condition does not exist among the plurality of fusion conditions stored in the storage device, the data management unit may determine whether an optical fiber management unit in the fusion condition providing system that manages a plurality of optical fibers that are available for use in newly creating the requested fusion condition by the new data management unit indicates that the pair of optical fibers for which the requested fusion condition is to be newly created are available for use, and if the optical fiber management unit does not indicate that the pair of optical fibers are available for use, the data management unit may transmit a request to the optical fiber management unit that causes the pair of optical fibers to be available for use in newly creating the requested fusion condition, and only after confirming that the optical fiber management unit indicates that the pair of optical fibers are available for use in newly creating the requested fusion condition, the data management unit may transmit the request to newly create the requested fusion condition to the new data management unit.

In the above-mentioned fusion condition server, the command for requesting the fusion condition may include index information that indicates at least types of the pair of optical fibers to be fusion spliced by the fusion splicer and a model of the fusion splicer.

In the above-mentioned fusion condition server, the command for requesting the fusion condition may further indicate an operating wavelength that is a wavelength of light passing through the optical fibers after the fusion splicing.

The fusion condition providing system according to the present invention exhibits the effect of making it possible to provide, as quickly as possible to a user's fusion splicer, a parameter set required for the fusion splicing of the optical fibers desired by the user.

It is to be understood that both the foregoing general description and the following detailed description are exemplary and explanatory, and are intended to provide further explanation of the invention as claimed.

BRIEF DESCRIPTION OF THE DRAWINGS

FIG. 2 is a view of one example of parameters in a parameter set used by functional parts of a user's fusion splicer in the embodiment of the present invention.

FIG. 3 is a view of one example of GUI used for the input of index information included in request information regarding fusion condition required by the user's fusion splicer in the embodiment of the present invention.

FIG. 4 is a view of one example of a fusion condition database in the embodiment of the present invention.

DETAILED DESCRIPTION OF EMBODIMENTS

A suitable embodiment of a fusion condition providing system according to the present invention will be described in detail below with reference to the drawings. The present invention is not limited by the present embodiment. Furthermore, it shall be noted that the drawings are schematic, and that the relationships among the dimensions of the respective elements, the proportions of the respective elements, etc., may differ in practice. Sections may differ in the relationships among the dimensions or proportions thereof even among the drawings.

Embodiment

Figure 1:
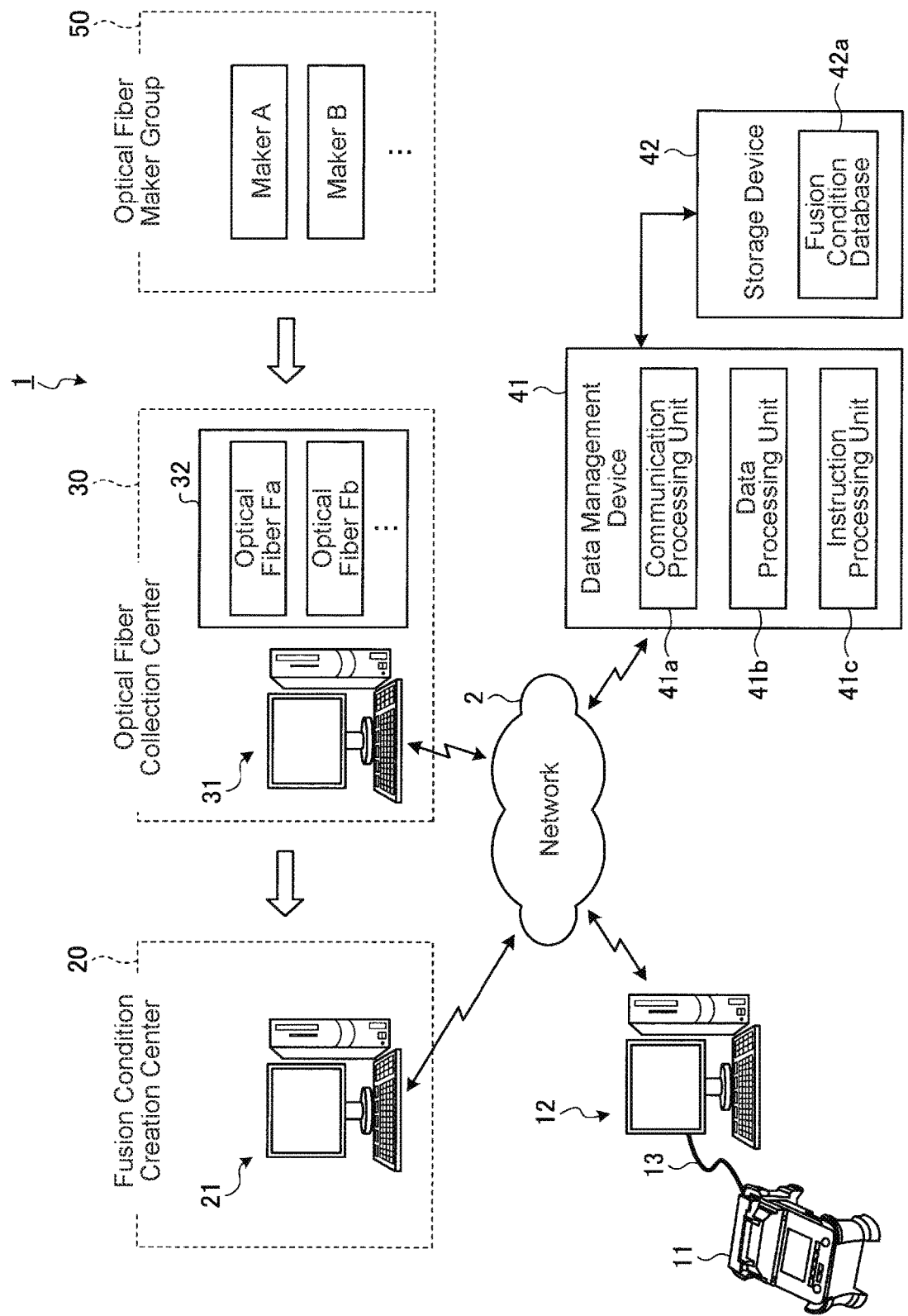
FIG. 1 is a view of one configuration example of a fusion condition providing system according to an embodiment of the present invention.

First, a configuration of a fusion condition providing system according to an embodiment of the present invention will be described. FIG. 1 is a view of one configuration example of the fusion condition providing system according to the embodiment of the present invention. The fusion condition providing system 1 according to the present embodiment provides a fusion condition to a fusion splicer that fusion-splices optical fibers. As shown in FIG. 1, the fusion condition providing system 1 includes a fusion splicer 11 and user-side communication terminal 12 used by a user, a new data management device (unit) 21 of a fusion condition creation center 20, an optical fiber management device (unit) 31 of an optical fiber collection center 30, a data management device (unit) 41 capable of communicating with the user-side communication terminal 12, new data management device 21, and optical fiber management device 31 via a network 2, and a storage device 42 that stores a plurality of fusion conditions for respective optical fiber pairs as parameter sets.

The fusion splicer 11 is a user's fusion splicer that is used by the user during fusion splicing of two optical fibers. Although not particularly shown in the drawings, the fusion splicer 11 includes a plurality of functional parts for fusion splicing two optical fibers (specifically, the respective ends of the two optical fibers) desired by the user in accordance with the passing-light wavelength desired by the user. The fusion splicer 11 includes, as the plurality of functional parts, a microscope part, an axis alignment mechanism, a heating device, and a feed mechanism, for example. The fusion splicer 11 also includes a control device that controls the plurality of functional parts on the basis of the parameters (setting values) of the parameter set serving as the fusion condition, and a storage device in which the plurality of parameter sets are stored in advance.

In the present embodiment, the fusion splicer 11 sequentially performs a position confirming step for confirming, via image processing of the microscope part, positions of the respective ends of two target optical fibers desired by the user, the ends being the targets of the fusion splicing, and an axis aligning step for aligning, via the axis alignment mechanism, the central axes (core axes) of the two optical fibers for which the position confirmation has been performed. Next, the fusion splicer 11 sequentially performs a heating step in which the respective ends of the two optical fibers of which the axes have been aligned are heated and melted by the heating device, and a splicing step for abutting, via the feed mechanism, the respective ends of the two optical fibers that have been heated and melted and then fusion splicing the two optical fibers. Thereafter, the fusion splicer 11 performs an inspecting step for optically inspecting the fusion spliced portion of the two optical fibers via the image processing of the microscope part. Furthermore, the fusion splicer 11 further includes a reinforcing mechanism (not shown) that reinforces the fusion spliced portion of the two optical fibers after the inspecting step. The reinforcing mechanism performs a reinforcing step for mechanically reinforcing the fusion spliced portion using a reinforcing member such as a sleeve. Through this series of steps, from the position confirming step to the reinforcing step described above, the fusion splicer 11 completes the fusion splicing of the two target optical fibers desired by the user and corresponding to the passing-light wavelength desired by the user.

In each step of the above-described series of steps, the control device of the fusion splicer 11 controls the functional parts of the fusion splicer 11 (e.g., the microscope part, axis alignment mechanism, heating device, feed mechanism, etc.) on the basis of the respective parameters of the parameter set required for fusion splicing the two optical fibers desired by the user.

FIG. 2 is a view of one example of the parameters in a parameter set used by the respective functional parts of the user's fusion splicer in the embodiment of the present invention. As shown in FIG. 2, the microscope part of the fusion splicer 11 uses, as parameters, optical fiber diameter, optical fiber core diameter, and optical fiber cross-sectional structure, for example. The optical fiber diameter is the diameter of each of the two optical fibers desired by the user. The optical fiber core diameter is the diameter of the core for each of the two optical fibers. The optical fiber cross-sectional structure is the refractive index distribution in the radial direction, the material of the core and cladding, the end face structure, etc., for each of the two optical fibers. The control device of the fusion splicer 11 reads these parameters from the storage device of the fusion splicer 11 and controls operations such as the image processing of the microscope part in the position confirming step and inspecting step described above on the basis of the respective parameters that have been read.

Furthermore, as shown in FIG. 2, the axis alignment mechanism of the fusion splicer 11 uses, as parameters, the passing-light wavelength (the passing-light wavelength desired by the user) and the optical fiber cross-sectional structure, for example. The control device of the fusion splicer 11 reads these parameters from the storage device of the fusion splicer 11 and controls the operation of the axis alignment mechanism in the axis aligning step described above on the basis of the respective parameters that have been read.

Meanwhile, as shown in FIG. 2, the heating device of the fusion splicer 11 uses, as parameters, initial heating temperature, molding heating temperature, and heating time, for example. The initial heating temperature is the initial heating temperature during the heating and melting of the respective ends of the two optical fibers desired by the user. The molding heating temperature is the heating temperature during molding while heating and melting the respective ends of the two optical fibers. The heating time is the heating time during heating and melting the respective ends of the two optical fibers at the initial heating temperature or the molding heating temperature. The control device of the fusion splicer 11 reads these parameters from the storage device of the fusion splicer 11 and controls the operation of the heating device in the heating step described above on the basis of the respective parameters that have been read.

Furthermore, as shown in FIG. 2, the feed mechanism of the fusion splicer 11 uses, as parameters, feed start time, feed distance, and feed speed, for example. The feed start time is the time at which one of the optical fibers begins to be fed toward the other optical fiber during abutting of the two optical fibers after the heating step. The feed distance is the movement distance during feeding of one optical fiber among the two optical fibers toward the other optical fiber. The feed speed is the movement speed during feeding of one optical fiber among the two optical fibers toward the other optical fiber. The control device of the fusion splicer 11 reads these parameters from the storage device of the fusion splicer 11 and controls the operation of the feed mechanism in the splicing step described above on the basis of the respective parameters that have been read.

The storage device of the fusion splicer 11 stores in advance a plurality of known parameter sets at the time of manufacture or sale of the fusion splicer 11. In the present embodiment, if the plurality of parameter sets preset in the storage device of the fusion splicer 11 do not include a parameter set that is adapted to the fusion splicing of the two optical fibers desired by the user and corresponding to the passing-light wavelength desired by the user, then the fusion splicer 11 newly acquires a corresponding parameter set from the data management device 41 via the network 2 and user-side communication terminal 12, as described later, and then stores this parameter set in the storage device therein. The control device of the fusion splicer 11, in accordance with the types and passing-light wavelength and the like of the two optical fibers desired by the user, switches the fusion condition to a parameter set that is adapted to the fusion splicing of the two optical fibers among the plurality of parameter sets stored inside the storage device described above (including newly acquired parameter sets). The control device of the fusion splicer 11 controls the respective functional parts of the fusion splicer 11 as described above on the basis of the respective parameters in the parameter set that has been switched to.

In the present embodiment, the two optical fibers desired by the user are two optical fibers that are desired by the user as targets for fusion splicing. The number of optical fibers desired by the user as targets for a single fusion splicing (the number of optical fibers desired by the user) is not limited to being two and may be a plurality (two or more). The passing-light wavelength desired by the user is a desired wavelength of light that passes through the plurality (two, for example) of optical fibers after fusion splicing. Furthermore, the parameter set serving as the fusion condition is not limited to including the parameters shown in FIG. 2, and may further include parameters other than those shown in FIG. 2, such as parameters of the reinforcing mechanism that performs the reinforcing step described above.

Meanwhile, the user-side communication terminal 12 shown in FIG. 1 functions as a user-side communication unit that performs, via the network 2, request and acquisition of the fusion condition for the fusion splicing of the two optical fibers desired by the user with the user's fusion splicer 11 in accordance with the passing-light wavelength desired by the user. In the present embodiment, the user-side communication terminal 12 is configured by using a computer such as a workstation that includes various types of processing functions, such as a communication function, an input function, and a display function, for example. As shown in FIG. 1, the user-side communication terminal 12 can communicate with the data management device 41 via the network 2. Specifically, the user-side communication terminal 12 transmits request information regarding the fusion condition required by the user to the data management device 41 via the network 2.

The aforementioned request information is information requesting a fusion condition required for the user's fusion splicer 11 (i.e., a command for requesting a fusion condition for a pair of optical fibers to be fusion spliced by a user's fusion splicer), or namely, a fusion condition (parameter set) for the fusion splicing of the two optical fibers desired by the user with the user's fusion splicer 11 in accordance with the passing-light wavelength desired by the user. The request information includes index information that indicates at least the types of the two optical fibers desired by the user and the model of the user's fusion splicer 11. Specifically, in the present embodiment, the request information includes index information that, in addition to the type of the optical fibers and the model of the fusion splicer 11, further indicates the passing-light wavelength desired by the user. This type of index information is input to the user-side communication terminal 12 by using a prescribed graphical user interface (GUI) or the like.

FIG. 3 is a view of one example of the GUI used for the input of index information included in the request information regarding the fusion condition required by the user's fusion splicer in the embodiment of the present invention. The request GUI 100 shown in FIG. 3 is a GUI for inputting index information that is realized by a browser provided from the data management device 41 to the user-side communication terminal 12 via the network 2, and the GUI is displayed on a display of the user-side communication terminal 12.

As shown in FIG. 3, the request GUI 100 includes a parameter type input column 101, an applied model input column 102, a passing-light wavelength input column 111, a splicing type input column 112, and a search icon 140. The request GUI 100 also includes, for a reinforcing member, a maker name input column 121, a reinforcing member length input column 122, and a maker model number input column 123. Furthermore, among the two optical fibers desired by the user, there is a first maker name input column 131a and first optical fiber information input column 131b for one of the optical fibers, and a second maker name input column 132a and second optical fiber information input column 132b for the other optical fiber.

The parameter type input column 101 is an input column for inputting the type of parameter requested to the data management device 41 via the network 2. Information indicating the parameter type requested by the user (in FIG. 3: "fusion condition") is set in the parameter type input column 101 by an input operation of the user-side communication terminal 12 by the user (e.g., an input key operation using a keyboard or a mouse operation that selects desired information from a dropdown list, etc.). The setting information regarding the parameter type is input to the user-side communication terminal 12 as a part of the index information.

The applied model input column 102 is an input column for inputting the model of the user's fusion splicer 11. Information indicating the model of the user's fusion splicer 11 (in FIG. 3: "Type ○ ○") is set in the applied model input column 102 by an input operation of the user-side communication terminal 12 that is generally the same as the case described above. The setting information regarding the model of the fusion splicer 11 is input to the user-side communication terminal 12 as a part of the index information.

The passing-light wavelength input column 111 is an input column for inputting the passing-light wavelength desired by the user. Information indicating the passing-light wavelength desired by the user (in FIG. 3: "1310 (nm)") is set in the passing-light wavelength input column 111 by an input operation of the user-side communication terminal 12 that is generally the same as the case described above. The setting information regarding the passing-light wavelength is input to the user-side communication terminal 12 as a part of the index information. The units of the passing-light wavelength that is input using the passing-light wavelength input column 111 are not limited to the nanometers (nm) shown in FIG. 3 and may be set to the desired units, such as micrometers (μm).

The splicing type input column 112 is an input column for inputting splicing type information that indicates whether the fusion splicing of the two optical fibers desired by the user is fusion splicing of optical fibers that are the same type or differing types. Information indicating the splicing type of the two optical fibers (in FIG. 3: "differing type fibers") is set in the splicing type input column 112 by an input operation of the user-side communication terminal 12 that is generally the same as the case described above. The setting information regarding the splicing type is input to the user-side communication terminal 12 as a part of the index information.

The maker name input column 121 is an input column for inputting the maker name of the reinforcing member, which is a sleeve or the like for reinforcing the fusion spliced portion of the two optical fibers desired by the user. Information indicating the maker name of the reinforcing member (in FIG. 3: "maker F") is set in the maker name input column 121 by an input operation of the user-side information terminal 12 that is generally the same as the case described above. The setting information regarding the maker name of the reinforcing member is input to the user-side communication terminal 12 as a part of the index information.

The reinforcing member length input column 122 is an input column for inputting the length of the reinforcing member described above. Information indicating the reinforcing member length such as sleeve length (in FIG. 3: "40 (mm)") is set in the reinforcing member length input column 122 by an input operation of the user-side communication terminal 12 that is generally the same as the case described above. The setting information regarding the reinforcing member length is input to the user-side communication terminal 12 as a part of the index information. The units of the reinforcing member length that are input using the reinforcing member length input column 122 are not limited to being the micrometers (mm) shown in FIG. 3 and may be set to the desired units, such as centimeters (cm).

The maker model number input column 123 is an input column for inputting the maker model number of the reinforcing member described above. Information indicating the maker model number of the reinforcing member (in FIG. 3: "XXX") is set in the maker model number input column 123 by an input operation of the user-side communication terminal 12 that is generally the same as the case described above. The setting information regarding the maker model number of the reinforcing member is input to the user-side communication terminal 12 as a part of the index information.

The first maker name input column 131a is an input column for inputting the maker name of one of the optical fibers among the two optical fibers desired by the user. Information indicating the maker name of one of the optical fibers (in FIG. 3: "Maker A") is set in the first maker name input column 131a by an input operation of the user-side communication terminal 12 that is generally the same as the case described above. The setting information regarding the one optical fiber maker name is input to the user-side communication terminal 12 as a part of the index information.

The first optical fiber information input column 131b is an input column for inputting the product name and type of the one optical fiber described above. Information indicating the product name and type of the one optical fiber (in FIG. 3: "Product name ○X, Type XX" is set in the first optical fiber information input column 131b by an input operation of the user-side communication terminal 12 that is generally the same as the case described above. The setting information regarding the product name and type of the one optical fiber is input to the user-side communication terminal 12 as a part of the index information.

The second maker name input column 132a is an input column for inputting the maker name of the other optical fiber among the two optical fibers desired by the user. Information indicating the maker name of the other optical fiber (in FIG. 3: "Maker B") is set in the second maker name input column 132a by an input operation of the user-side communication terminal 12 that is generally the same as the case described above. The setting information regarding the other optical fiber maker name is input to the user-side communication terminal 12 as a part of the index information.

The second optical fiber information input column 132b is an input column for inputting the product name and type of the other optical fiber described above. Information indicating the product name and type of the other optical fiber (in FIG. 3: "Product name Δ ○, Type Δ Δ") is set in the second optical fiber information input column 132b by an input operation of the user-side communication terminal 12 that is generally the same as the case described above. The setting information regarding the product name and type of the other optical fiber is input to the user-side communication terminal 12 as a part of the index information.

The search icon 140 is an icon for causing the data management device 41 to start the search process for the parameter set serving as the fusion condition requested by the user via the network 2. The search icon 140 is a button type icon, and an input operation is possible by a click operation of a mouse or the like by the user. When an input operation of the search icon 140 has been performed by a click operation or the like, search instruction information for causing the data management device 41 to start the search process for the parameter set requested by the user is input to the user-side communication terminal 12 via the network 2.

The user-side communication terminal 12 transmits the request information regarding the parameter set serving as the fusion condition requested by the user to the data management device 41 via the network 2 on the basis of the search instruction information corresponding to the input operation of the search icon 140. At such time, the user-side communication terminal 12 includes the various types of information that is input by using the request GUI 100 described above in the request information as index information, and then transmits the aforementioned request information to the data management device 41. In so doing, the user-side communication terminal 12 requests to the data management device 41, via the network 2, to search for and obtain a parameter set corresponding to the index information (i.e., the fusion condition requested by the user). In the present embodiment, the fusion condition requested by the user is a parameter set requested by the user as a fusion condition that is required for fusion splicing of the two optical fibers desired by the user with the user's fusion splicer 11 in accordance with the passing-light wavelength desired by the user.

The user-side communication terminal 12 acquires the parameter set serving as the fusion condition requested by the user from the data management device 41 via the network 2. In the present embodiment, as shown in FIG. 1, the fusion splicer 11 and user-side communication terminal 12 are connected so as to be able to communicate by a communication cable 13 such as a USB cable. The user-side communication terminal 12 provides the parameter set acquired from the data management device 41 as described above to the fusion splicer 11 by signal transmission (transfer) to the fusion splicer 11 via the communication cable 13.

Meanwhile, the fusion condition creation center 20 shown in FIG. 1 is a service center for creating the parameter set serving as the fusion condition of the two optical fibers that are the targets of fusion splicing. As shown by the wide arrow in FIG. 1, the fusion condition creation center 20 is provided with a plurality of optical fibers from the optical fiber collection center 30 as samples for parameter set creation. The fusion condition creation center 20 also includes devices such as a plurality of models of fusion splicers that will be selected and used for parameter set creation. In the fusion condition creation center 20, a parameter set that is adapted to the fusion splicing of two optical fibers is newly created in accordance with the target passing-light wavelength by using the two optical fibers that will be selected from among the plurality of provided optical fibers and by using one model of the fusion splicer selected from among the plurality of models of fusion splicers.

In the fusion condition creation center 20, the combination of the two optical fibers used in the creation of the parameter set may be selected as desired from among the plurality of optical fibers provided from the optical fiber collection center 30, but it is desirable that the combination be selected according to a prescribed priority ranking. For example, in the prescribed priority ranking, the priority ranking may be such that a combination of two optical fibers corresponding to the parameter set for which creation has been instructed from the data management device 41 via the network 2 is set as having the highest priority, or the priority ranking may be such that the priority ranking lowers from a high possibility or frequency as a combination of two optical fibers to be fusion spliced on the user side to a low possibility or frequency.

The new data management device 21 manages the new parameter set that has been newly created in the fusion condition creation center 20. In the present embodiment, the new data management device 21 is configured by using a computer such as a workstation provided with various types of processing functions, and as shown in FIG. 1, the new data management device is disposed in the fusion condition creation center 20. The new data management device 21 associates the new parameter set created in the fusion condition creation center 20 with the types of the two optical fibers, the model of the fusion splicer, and the passing-light wavelength used in the creation of the new parameter set, and then stores and manages the parameter set.

Furthermore, the new data management device 21 can communicate with the optical fiber management device 31 and the data management device 41 via the network 2. The new data management device 21 transmits the new parameter set being managed as described above to the data management device 41 along with information indicating the type of the two optical fibers, the model of the fusion splicer, and the passing-light wavelength associated with the parameter set. At such time, the new data management device 21 sequentially transmits a new parameter set that has been created to the data management device 41 each time the new parameter set has been created as desired in the fusion condition creation center 20 or created in accordance with creation instructions from the data management device 41. Meanwhile, the new data management device 21 suitably transmits instruction information instructing the providing of the two optical fibers used in the creation of the new parameter set to the optical fiber management device 31. This facilitates the providing of the optical fibers from the optical fiber collection center 30 to the fusion condition creation center 20.

The optical fiber collection center 30 shown in FIG. 1 is a collection center for collecting optical fibers used in the fusion condition creation center 20. As shown by the wide arrow in FIG. 1, the optical fiber collection center 30 collects a large variety of optical fibers (specifically, the samples thereof) from the respective optical fiber makers (e.g., maker A and maker B, etc.) of a prescribed optical fiber maker group 50. In the optical fiber collection center 30, the large variety of the plurality of optical fibers that have been collected are stored as an optical fiber group 32. In the optical fiber group 32, the two optical fibers used in the creation of the parameter set (e.g., optical fiber Fa and optical fiber Fb) are provided to the fusion condition creation center 20 sequentially and as necessary from the optical fiber collection center 30.

The optical fiber management device 31 manages the types of the plurality of optical fibers collected from one or more optical fiber makers in the optical fiber collection center 30. In the present embodiment, the optical fiber management device 31 is configured by using a computer such as a workstation provided with various types of processing functions, and as shown in FIG. 1, the optical fiber management device is disposed in the optical fiber collection center 30. The optical fiber management device 31 stores and manages identifying information regarding the types of the large variety of optical fibers (namely, the optical fiber group 32) that have been collected in the optical fiber collection center 30 from the respective optical fiber makers of the optical fiber maker group 50.

The identifying information is information that can identify the types of the large variety of optical fibers that have been collected for each optical fiber. Examples of this type of identifying information include the maker name, product name, and type of optical fiber, etc. The optical fiber management device 31, by storing and managing this type of identifying information for each optical fiber, manages the types of the respective optical fibers of the optical fiber group 32 in the optical fiber collection center 30. The optical fiber management device 31 can confirm whether the target optical fiber is currently present in the optical fiber collection center 30 by using the types (the identifying information) of the respective optical fibers of the optical fiber group 32 being managed in this manner.

The data management device 41 and storage device 42 shown in FIG. 1 hold and manage the parameter set to be provided in accordance with the request by the user, thereby constituting a fusion condition server. As shown in FIG. 1, the data management center 41 can communicate, via the network 2, with the user-side communication terminal 12, the new data management device 21 of the fusion condition creation center 20, and the optical fiber management device 31 of the optical fiber collection center 30. The network 2 is a communication network such as the internet or a local area network (LAN), for example. The data management device 41 acquires the new parameter set from the new data management device 21 via the network 2 and manages the new parameter set that has been acquired as one of the parameters to be provided in accordance with the request by the user as well as stores the parameter set in the storage device 42.

Furthermore, as shown in FIG. 1, the data management device 41 includes a communication processing unit 41a, a data processing unit 41b, and an instruction processing unit 41c. The communication processing unit 41a performs, via the network 2, a communication process with the user-side communication terminal 12, a communication process with the new data management device 21, and a communication process with the optical fiber management device 31. For example, the communication processing unit 41a transmits and receives, with the user-side communication terminal 12, various types of information and data, such as the request information regarding the fusion condition requested by the user, the parameter set serving as the fusion condition requested by the user, etc. Furthermore, the communication processing unit 41a transmits and receives, with the new data management device 21, various types of information and data, such as creation instruction information regarding the fusion condition (parameter set) requested by the user, the new parameter set created in the fusion condition creation center 20, etc. The communication processing unit 41a transmits and receives, with the optical fiber management device 31, various types of information and data, such as the collection instruction information regarding the optical fibers required for the new parameter set.

The data processing unit 41b performs various types of data processing, such as a search process for the parameter set in the stored data inside the storage device 42, an extraction process of the parameter set found by the search process, etc. The instruction processing unit 41c performs, via the network 2, various types of instruction to the new data management device 21, optical fiber management device 31, etc.

The storage device 42 stores fusion conditions for the fusion splicing of two optical fibers with an arbitral fusion splicer. Each fusion condition is a parameter set that is associated with at least the types of the two optical fibers to be fusion spliced and the model of the fusion splicer to be used for the fusion splicing of the two optical fibers. Specifically, in the present embodiment, the fusion condition is a parameter set that is associated with, in addition to the types of optical fibers and model of the fusion splicer described above, the passing-light wavelength, which is the wavelength of light passing through the two optical fibers after fusion splicing. The storage device 42 stores each of the plurality of parameter sets in association with the types of optical fibers, the model of the fusion splicer, and the passing-light wavelength described above. Specifically, as shown in FIG. 1, the storage device 42 stores a fusion condition database 42a that includes a plurality of parameter sets.

The fusion condition database 42a stores the plurality of parameter sets in association with the types of the two optical fibers to be fusion spliced, the model of the fusion splicer to be used for the fusion splicing, and the target passing-light wavelength. FIG. 4 is a view of one example of the fusion condition database in the embodiment of the present invention. As shown in FIG. 4, the fusion condition database 42a includes index information for identifying the parameter set serving as the fusion condition, and parameter set associated with the index information.

As shown in FIG. 4, the index information includes first optical fiber identifying information, second optical fiber identifying information, passing-light wavelength, and fusion splicing identifying information. The first optical fiber identifying information and second optical fiber identifying information are information for identifying the types of the two optical fibers that are the target of fusion splicing. The first optical fiber identifying information is information for identifying the type of one of the optical fibers among the two optical fibers, and is the maker name and type or the like of the one optical fiber, for example. The second optical fiber identifying information is information for identifying the type of the other optical fiber among the two optical fibers, and is the maker name and type or the like of the other optical fiber, for example. Although not shown in FIG. 4, the first optical fiber identifying information may further include the product name of the one optical fiber, and the second optical fiber identifying information may further include the product name of the other optical fiber.

Furthermore, as shown in FIG. 4, the passing-light wavelength in the index information is numerical information that indicates the passing-light wavelength after fusion splicing of the optical fiber of the type identified by the first optical fiber identifying information and the optical fiber of the type identified by the second optical fiber identifying information. The fusion splicing identifying information is information for identifying the model of the fusion splicer used for the fusion splicing of the optical fiber of the type identified by the first optical fiber identifying information and the optical fiber of the type identified by the second optical fiber identifying information. As shown in FIG. 4, the fusion splicer identifying information is the type or the like that indicates the model of the fusion splicer, for example.

Meanwhile, the plurality of parameter sets stored in the fusion condition database 42a are respectively associated with the types of the two optical fibers that are the targets of fusion splicing, the passing-light wavelength, and the model of the fusion splicer used for the fusion splicing, which are based on the index information described above. Specifically, as shown in FIG. 4, each of the plurality of parameter sets is associated with the type of the optical fiber identified by the first optical fiber identifying information, the type of the optical fiber identified by the second optical fiber identifying information, the numerical information regarding the passing-light wavelength, and the model of the fusion splicer identified by the fusion splicer identifying information. For example, among the plurality of parameter sets, the parameter set of parameter set No. #1 is associated with the types of the two optical fibers, the passing-light wavelength, and the model of the fusion splicer based on the index information in the same column as parameter set No. #1. Each of these plurality of parameter sets includes the respective parameters required by the fusion splicer used for fusion splicing of two optical fibers (respective parameters such as the "initial heating temperature" illustratively indicated in FIGS. 2 and 4). The respective parameters may further include parameters for the reinforcing mechanism that performs the reinforcing step described above (for example, the attachment condition of the reinforcing member on the fusion spliced portion of the two optical fibers, or the like).

Figure 5:
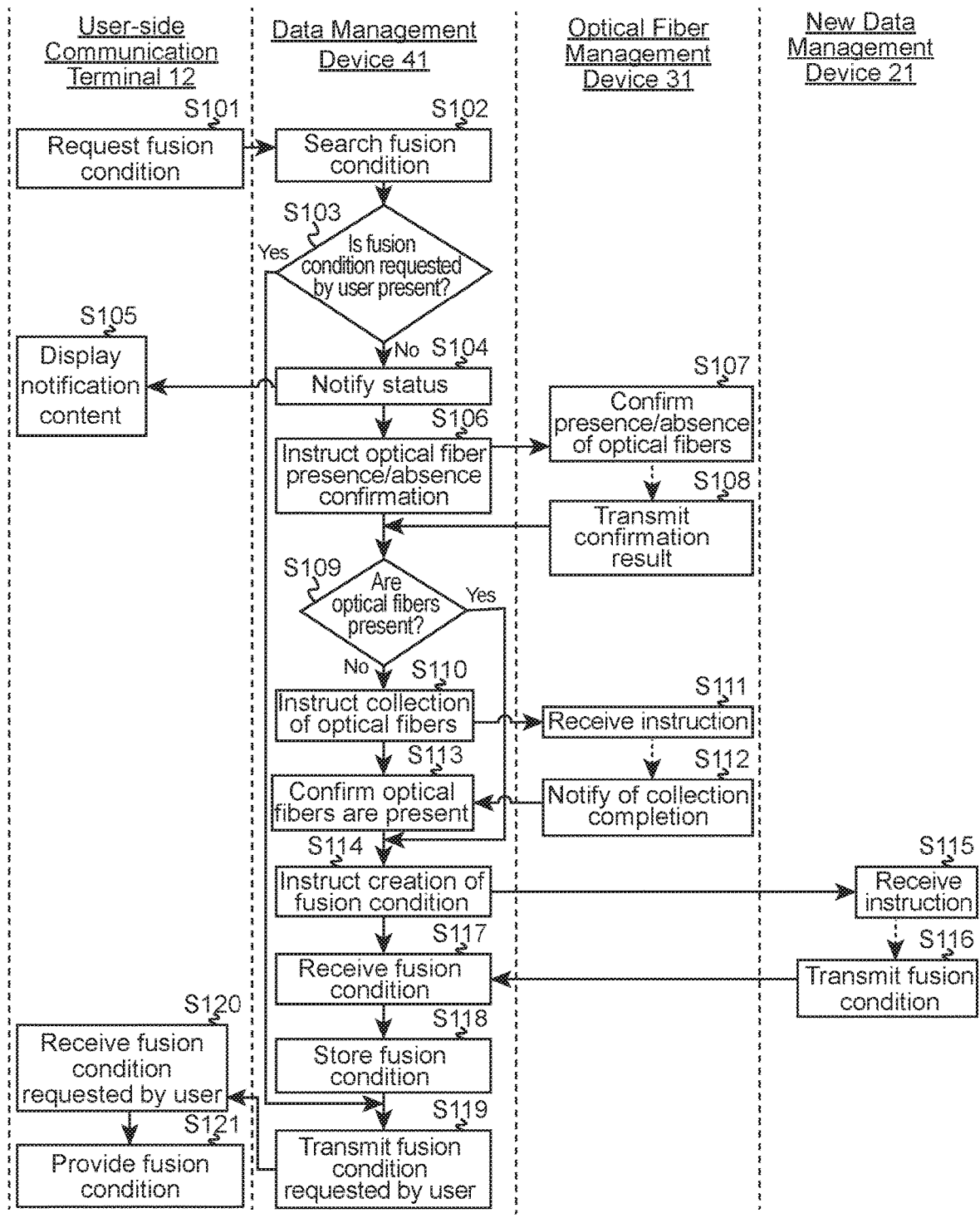
FIG. 5 is a flow diagram showing one example of a processing procedure of the fusion condition providing system according to the embodiment of the present invention.

Next, the processing procedure of the fusion condition providing system 1 having the aforementioned configuration will be described. FIG. 5 is a flow diagram showing one example of a processing procedure of the fusion condition providing system according to the embodiment of the present invention. In the fusion condition providing system 1 according to the present embodiment, if the user's fusion splicer 11 has no parameter set that is adapted to the fusion splicing of the two optical fibers desired by the user and corresponding to the passing-light wavelength desired by the user, then the respective processing procedures shown in FIG. 5 are performed as appropriate in order to provide the required parameter set to the fusion splicer 11 from the data management device 41 via the network 2 or the like.

In other words, as shown in FIG. 5, first, a request process for the required fusion condition is performed in the fusion condition providing system 1 (step S101). In step S101, the user-side communication terminal 12 transmits the request information regarding the fusion condition required by the user's fusion splicer 11 to the data management device 41 via the network 2. The aforementioned request information requests the fusion condition for fusion splicing of the two optical fibers desired by the user with the user's fusion splicer 11 in accordance with the passing-light wavelength desired by the user. This type of request information includes the various types of information (e.g., the model of the fusion splicer 11, etc.) input by using the request GUI 100 shown in FIG. 3 as index information. The user-side communication terminal 12, by transmitting the request information to the data management device 41 as described above, requests the data management device 41 for the fusion condition required by the user's fusion splicer' 11 via the network 2.

After executing step S101, in the fusion condition providing system 1, a search process is performed with respect to the storage device 42 of the data management device 41 for the fusion condition requested by the user (step S102). In step S102, the communication processing unit 41a of the data management device 41 receives the request information from the user-side communication terminal 12 via the network 2. Next, in accordance with the received request information, the data processing unit 41b of the data management device 41 performs a search process for the fusion condition requested by the user with respect to the fusion condition database 42a inside the storage device 42 where the plurality of parameter sets are stored. At such time, on the basis of the index information included in the aforementioned request information, the data management unit 41b acquires the types of the two optical fibers desired by the user, the model of the user's fusion splicer 11, and the passing-light wavelength desired by the user which are indicated in the index information. Next, the data processing unit 41b searches, as the fusion condition requested by the user, for the parameter set corresponding to the acquired types of the two optical fibers desired by the user, model of the user's fusion splicer' 11, and passing-light wavelength desired by the user from the fusion condition database 42a inside the storage device 42. The data processing unit 41b may narrow the candidates of the fusion condition requested by the user to be searched from the fusion condition database 42a on the basis of information regarding the splicing type ("splicing of optical fibers of differing types" or "splicing of optical fibers of the same type") included in the aforementioned request information that has been input by using the request GUI 100 shown in FIG. 3, and then search for the fusion condition requested by the user from among the narrowed candidates.

After executing step S102, in the fusion condition providing system 1, a presence/absence determination process is performed for the fusion condition requested by the user on the stored data in the storage device 42 of the data management device 41 (step S103). In step S103, the data processing unit 41b of the data management device 41 determines whether the fusion condition requested by the user is present in the fusion condition database 42a inside the storage device 42 on the basis of the search result of the fusion condition requested by the user from the fusion condition database 42a (the plurality of parameter sets) in step S102 described above.

If the data processing unit 41b has determined, as a result of the presence/absence determination process in step S103, that the fusion condition requested by the user is not present (step S103, No), then the communication processing unit 41a of the data management device 41 transmits status information indicating that the fusion condition requested by the user is not present inside the storage device 42 to the user-side communication terminal 12 via the network 2. In this manner, the communication processing unit 41a notifies the user-side communication terminal 12 via the network 2 that the fusion condition requested by the user is not present (step S104).

The user-side communication terminal 12 performs a display process of the notification content from the data management device 41 in accordance with step S104 described above (step S105). In step S105, the user-side communication terminal 12 receives the status information from step S104 described above from the data management device 41 via the network 2. Next, the user-side communication terminal 12 displays the notification content from the received status information (for example, information indicating that the fusion condition requested by the user is not present inside the storage device 42 of the data management device 41) on a display. At such time, on the basis of the aforementioned status information, the user-side communication terminal 12 may further display, on the display, information indicating that the data management device 41 is currently preparing the fusion condition requested by the user, such as "the fusion condition requested by the user is being prepared."

Meanwhile, the data management device 41, after executing step S104 described above, determines via the network 2 whether there are the two optical fibers required for creation of the fusion condition requested by the user in the optical fiber group 32 (plurality of optical fibers) of which the types are managed by the optical fiber management device 31 of the optical fiber collection center 30. At such time, in the fusion condition providing system 1, the respective processes of steps S106 to S109 are sequentially performed.

In other words, the instruction processing unit 41c of the data management device 41 creates presence/absence confirmation instruction information that instructs a presence/absence confirmation of the two optical fibers required for creation of the fusion condition requested by the user. Next, the communication processing unit 41a of the data management device 41 transmits the presence/absence confirmation instruction information to the optical fiber management device 31 via the network 2. In this manner, the data management device 41 instructs the presence/absence confirmation of the two required optical fibers to the optical fiber management device 31 via the network 2 (step S106).

The optical fiber management device 31 performs a presence/absence confirmation process for the optical fibers in accordance with step S106 described above (step S107). In step S107, the optical fiber management device 31 receives presence/absence confirmation instruction information from the data management device 41 via the network 2. Next, the optical fiber management device 31 confirms whether the two optical fibers for which the presence/absence confirmation has been instructed by the received presence/absence confirmation instruction information are in the optical fiber group 32 of the optical fiber collection center 30. At such time, the optical fiber management device 31, on the basis of specifying information regarding the type of the optical fiber managed thereby, confirms whether the two optical fibers that are the presence/absence confirmation targets of the aforementioned presence/absence confirmation instruction information are in the optical fiber group 32 of the optical fiber collection center 30.

Next, the optical fiber management device 31 transmits the presence/absence confirmation result of the two optical fibers from step S107 (information indicating that the two optical fibers that are the presence/absence confirmation targets are "present" or "absent") to the data management device 41 via the network 2 (step S108).

The communication processing unit 41a of the data management device 41 receives the presence/absence confirmation result transmitted from the optical fiber management device 31 from step S108 described above. Next, the data processing unit 41b of the data management device 41, on the basis of the presence/absence confirmation result from the optical fiber management device 31, determines whether the two optical fibers required for creation of the fusion condition requested by the user are in the plurality of optical fibers (i.e., the optical fiber group 32 collected in the optical fiber collection center 30) of which the types are managed by the optical fiber management device 31 (step S109).

If, as a result of the presence/absence determination process in step S109, the data processing unit 41b determines that the two optical fibers required for creation of the fusion condition requested by the user are absent (step S109, No), then the fusion condition requested by the user is not inside the storage device 42 of the data management device 41, and the two optical fibers required for creation of the fusion condition requested by the user are not in the optical fiber collection center 30. In this type of state, the data management device 41 instructs collection of the two required optical fibers to the optical fiber management device 31 via the network 2 (step S110). In step S110, the instruction processing unit 41c of the data management device 41 creates collection instruction information that instructs the collection of the two required optical fibers. Next, the communication processing unit 41a of the data management device 41 transmits the created collection instruction information to the optical fiber management device 31 via the network 2.

The optical fiber management device 31, in accordance with step S110 described above, receives the collection instruction information transmitted from the data management device 41 via the network 2 (step S111). Next, the optical fiber management device 31 displays the instruction content of the collection instruction information (information such as the types of the two optical fibers for which collection has been instructed, for example) on the display. In this manner, the optical fiber management device 31 notifies the operator of the optical fiber collection center 30 of the instruction content of the collection instruction information.

In the optical fiber collection center 30, the operator confirms the instruction content of the collection instruction information displayed on the optical fiber management device 31 as described above. The operator, in accordance with the confirmed instruction content, collects the two optical fibers for which collection has been instructed from the data management device 41 from one or more optical fiber makers among the optical fiber maker group 50. After the two optical fibers are collected in the optical fiber collection center 30, specifying information regarding the types of the two optical fibers that have been newly collected is input to the optical fiber management device 31.

The optical fiber management device 31 newly stores and manages the input specifying information, and transmits, to the data management device 41 via the network 2, collection completion information indicating that collection has been completed for the two required optical fibers in the optical fiber collection center 30 in accordance with the collection instruction information received in step S111 described above. In this manner, the optical fiber management device 31 notifies the data management device 41 via the network 2 of the collection completion of the two optical fibers for which collection was instructed from the data management device 41 as described above (step S112), and the optical fiber management device notifies the data management device 41 that the two required optical fibers are in the optical fiber group 32 of the optical fiber collection center 30.

The data management device 41, in accordance with step S112 described above, confirms that the two required optical fibers are in the optical fiber collection center 30 (step S113). In step S113, the communication processing unit 41a of the data management device 41 receives the collection completion information transmitted from the optical fiber management device 31 in step S112 described above. Next, the data processing unit 41b of the data management device 41, on the basis of the collection completion information, confirms that the two required optical fibers for which collection was instructed to the optical fiber management device 31 in step S110 described above are in the optical fiber group 32 of the optical fiber collection center 30.

At the point in time after execution of step S113 described above, the fusion condition requested by the user is not inside the storage device 42 of the data management device 41, but the two optical fibers required for creation of the fusion condition requested by the user are in the optical fiber collection center 30. In this type of state, the data management device 41 instructs the creation of the fusion condition requested by the user to the new data management device 21 of the fusion condition creation center 20 via the network 2 (step S114).

In step S114, the instruction processing unit 41c of the data management device 41 creates creation instruction information that instructs the creation of the fusion condition requested by the user. Next, the communication processing unit 41a of the data management device 41 transmits the creation instruction information to the new data management device 21 via the network 2. In other words, after the collection of the two required optical fibers has been completed in accordance with the collection instruction information received by the optical fiber management device 31 as described above, the data management device 41 executes transmission of the creation instruction information to the new data management device 21.

The new data management device 21, in accordance with step S114 described above, receives the creation instruction information transmitted from the data management device 41 via the network 2 (step S115). Next, the new data management device 21 displays the instruction content of the creation instruction information (information such as that regarding the optical fiber and fusion splicer relating to the fusion condition requested by the user for which creation has been instructed, for example) on the display. In this manner, the new data management device 21 notifies the operator of the fusion condition creation center 20 of the instruction content of the creation instruction information.

In the fusion condition creation center 20, the operator confirms the instruction content of the creation instruction information displayed by the new data management device 21 as described above. The operator, in accordance with the confirmed instruction content, obtains the two optical fibers required for creation of the fusion condition requested by the user from the optical fiber collection center 30. The operator creates a new parameter set serving as the fusion condition requested by the user in accordance with the passing-light wavelength desired by the user by using the two obtained optical fibers (optical fibers of the same types as the two optical fibers desired by the user) and a fusion splicer of the same model as the user's fusion splicer 11. The types of the two optical fibers desired by the user, the model of user's fusion splicer 11, and the passing-light wavelength desired by the user are included in the creation instruction information regarding the fusion condition requested by the user. The operator can find out these pieces of information from the instruction content of the creation instruction information displayed on the new data management device 21.

The new data management device 21 manages the new parameter set newly created in the fusion condition creation center 20 in accordance with the creation instruction information received in step S115 described above in association with the types of the two optical fibers desired by the user, the model of the user's fusion splicer 11, and the passing-light wavelength desired by the user, and the new data management device transmits the new parameter set to the data management device 41 via the network 2 (step S116).

Thereafter, in the fusion condition providing system 1, the new parameter set corresponding to the aforementioned creation instruction information is transmitted to the data management device 41 via the network 2 from the new data management device 21 in step S116, and the new parameter set is stored in the storage device 42 as part of a plurality of parameter sets inside the fusion condition database 42a managed by the data management device 41. Furthermore, the new parameter set is transmitted to the user-side communication terminal 12 via the network 2 from the data management device 41 as the fusion condition requested by the user.

In other words, in accordance with step S116 described above, the communication processing unit 41a of the data management device 41 receives, from the new data management device 21 via the network 2, the new parameter set serving as the fusion condition requested by the user for which creation was instructed (step S117). Next, the data processing unit 41b of the data management device 41 manages the new parameter set received in step S117 while associating the new parameter set with the corresponding types of the two optical fibers, model of the fusion splicer, and passing-light wavelength, and the data processing unit stores the new parameter set inside the storage device 42 as a part of the fusion condition database 42a (step S118). At this time, the new parameter set is associated with the types of the two optical fibers desired by the user, the model of the user's fusion splicer 11, and the passing-light wavelength desired by the user.

Next, in the data management device 41, the data processing unit 41b reads the parameter set (new parameter set) associated with the types of the two optical fibers desired by the user, the model of the user's fusion splicer 11, and the passing-light wavelength desired by the user from the fusion condition database 42a inside the storage device 42. Next, the communication processing unit 41a transmits the parameter set that has been read to the user-side communication terminal 12 via the network 2 from the data management device 41 as the fusion condition requested by the user (step S119).

In the fusion condition providing system 1, the fusion condition requested by the user that has been transmitted to the user-side communication terminal 12 in this manner is provided to the user's fusion splicer 11 via signal transmission from the user-side communication terminal 12. In other words, the user-side communication terminal 12 receives the parameter set serving as the fusion condition requested by the user transmitted from the data management device 41 in step S119 described above (step S120). Next, the user-side communication terminal 12 provides the received parameter set to the user's fusion splicer 11 via signal transmission (data transfer) through the communication cable 13 (step S121). The foregoing achieves the providing of the fusion condition requested by the user to the user's fusion splicer 11 by the fusion condition providing system 1. In step S121, the user-side communication terminal 12, before providing the parameter set serving as the fusion condition requested by the user to the fusion splicer 11, may display a screen requesting the input of a pre-registered password on the display and then only provide the parameter set to the fusion splicer 11 when the correct password has been input.

Meanwhile, if, as a result of the presence/absence determination process in step 103 described above, the data processing unit 41b determines that the fusion condition requested by the user is present (step S103, Yes), the fusion condition requested by the user is stored inside the storage device 42 of the data management device 41, and the data processing unit 41b of the data management device 41 acquires the parameter set serving as the fusion condition requested by the user from the storage device 42 via the search process of step S102. In this type of state, in the fusion condition providing system 1, the process proceeds from step S103 to step S119, and the processes from step S119 onward are performed.

On the other hand, if, as a result of the presence/absence determination process in step S109 described above, the data processing unit 41b determines that the two optical fibers required for creation of the fusion condition requested by the user are present (step S109, Yes), then the fusion condition requested by the user is not inside the storage device 42 of the data management device 41, but the two optical fibers required for creation of the fusion condition requested by the user are collected and stored in the optical fiber collection center 30. In this type of state, in the fusion condition providing system 1, the process proceeds from step S109 to step S114, and the processes from step S114 onward are performed.

In the fusion condition providing system 1, if the parameter set adapted to the fusion splicing of the two optical fibers desired by the user and corresponding to the passing-light wavelength desired by the user is not present in the user's fusion splicer 11, then at such time the processes of steps S101 to S121 shown in FIG. 5 are performed as appropriate.

As described above, in the embodiment of the present invention, a plurality of parameter sets each serving as a fusion condition for fusion splicing optical fibers with a fusion splicer are stored in the storage device in association with the types of the optical fibers to be fusion spliced, the model of the fusion splicer to be used for the fusion splicing, and the target passing-light wavelength. Request information regarding the fusion condition for fusion splicing the optical fibers desired by the user with the user's fusion splicer in accordance with the passing-light wavelength desired by the user is transmitted to the data management device via the network from the user-side communication unit. The data management device searches for, from the plurality of parameter sets inside the storage device and in accordance with the request information received from the user-side communication unit via the network, the parameter set, as the fusion condition requested by the user, that corresponds to the types of the optical fibers desired by the user, the model of the user's fusion splicer, and the passing-light wavelength desired by the user. The data management device transmits the obtained fusion condition requested by the user to the user-side communication unit via the network. The parameter set serving as the fusion condition requested by the user transmitted to the user-side communication unit from the data management device via the network is provided to the user's fusion splicer from the user-side communication unit via signal transmission through the communication cable or the like.

Due to this, in a state where a parameter set adapted to the fusion splicing of the optical fibers desired by the user is not stored in the user's fusion splicer, it is possible to save the time and effort of the user from newly creating a parameter set that is adaptable to the fusion splicing, and also possible to shorten, to the greatest extent possible, the time required for the maker (including the fusion splicer manufacturing maker and shop) to prepare the providing of the parameter set corresponding to the request of the user after the necessity for a parameter set for the fusion splicer has occurred with the user. As a result, it is possible to provide, as quickly as possible to the user's fusion splicer, the parameter set required for the fusion splicing of the optical fibers desired by the user.

Furthermore, in the embodiment of the present invention, the new parameter set that has been newly created in the fusion condition creation center is managed by the new data management device in association with the types of the optical fibers, the model of the fusion splicer, and the passing-light wavelength used in the creation. The data management device determines the presence/absence of the fusion condition requested by the user in the plurality of parameter sets inside the storage device, and if the fusion condition requested by the user is present, then the fusion condition requested by the user that is searched and retrieved from the plurality of parameter sets is transmitted to the user-side communication unit via the network. If the fusion condition requested by the user is absent, then creation instruction information regarding the fusion condition requested by the user is transmitted to the new data management device via the network. The new data management device manages the new parameter set created in the fusion condition creation center in accordance with the creation instruction information received from the data management device via the network in association with the types of the two optical fibers desired by the user, the model of the user's fusion splicer, and the passing-light wavelength desired by the user, and transmits the new parameter set to the data management device via the network. The new parameter set corresponding to the aforementioned creation instructions is transmitted to the data management device from the new data management device via the network and stored in the storage device described above, and transmitted to the user-side communication unit from the data management device via the network as the fusion condition requested by the user.

Due to this, even if the fusion condition (parameter set) requested by the user is not stored in the plurality of parameter sets inside the storage device managed by the data management device, it is possible for a provider to simplify the work process for newly creating a parameter set corresponding to the requests by the user and then providing the parameter set to the user, and it is also possible for the provider to shorten, to the greatest extent possible, the time required to create and provide the new parameter set (the fusion condition requested by the user) corresponding to the request by the user. As a result, even if the fusion condition requested by the user is not stored on the provider side, it is possible to provide, as quickly as possible, a new parameter set serving as the fusion condition requested by the user to the user's fusion splicer.

Furthermore, in the embodiment of the present invention, the optical fiber management device manages the types of the plurality of optical fibers collected from the optical fiber makers for use in the creation of the new parameter sets. The data management device determines the presence/absence of the fusion condition requested by the user as described above, and if the fusion condition requested by the user is absent, determines via the network whether the optical fibers required for creation of the fusion condition requested by the user are present in the plurality of optical fibers under management of the optical fiber management device. If the required optical fibers are present, then the data management device transmits the creation instruction information described above to the new data management device via the network, and if the required optical fibers are absent, then the data management device transmits the collection instruction information regarding the required optical fibers to the optical fiber management device via the network. After the collection of the required optical fibers has been completed in accordance with the collection instruction information received by the optical fiber management device, the data management device transmits the creation instruction information described above to the new data management device via the network.

Due to this, even if the optical fibers required for creation of the new parameter set corresponding to the requests by the user are not in the optical fiber collection center, the optical fiber collection center can be instructed to collect the required optical fibers soon from the timing of the requests by the user, and it is possible for the provider to shorten, to the greatest extent possible, the time required for creation preparation, creation, and providing of the new parameter set (fusion condition requested by the user) corresponding to the request by the user. As a result, even if the optical fibers required for creation of the fusion condition requested by the user are not collected, it is possible to provide, as quickly as possible, a new parameter set serving as the fusion condition requested by the user to the user's fusion splicer.

In the embodiment described above, the user-side communication terminal 12 was illustratively indicated as one example of a user-side communication unit that performs requesting of the necessary fusion condition, acquisition of the fusion condition requested by the user, etc., and the fusion condition (parameter set) requested by the user was transmitted to the user's fusion splicer 11 from the user-side communication terminal 12 via the communication cable 13, but the present invention is not limited to this.

Figure 6:
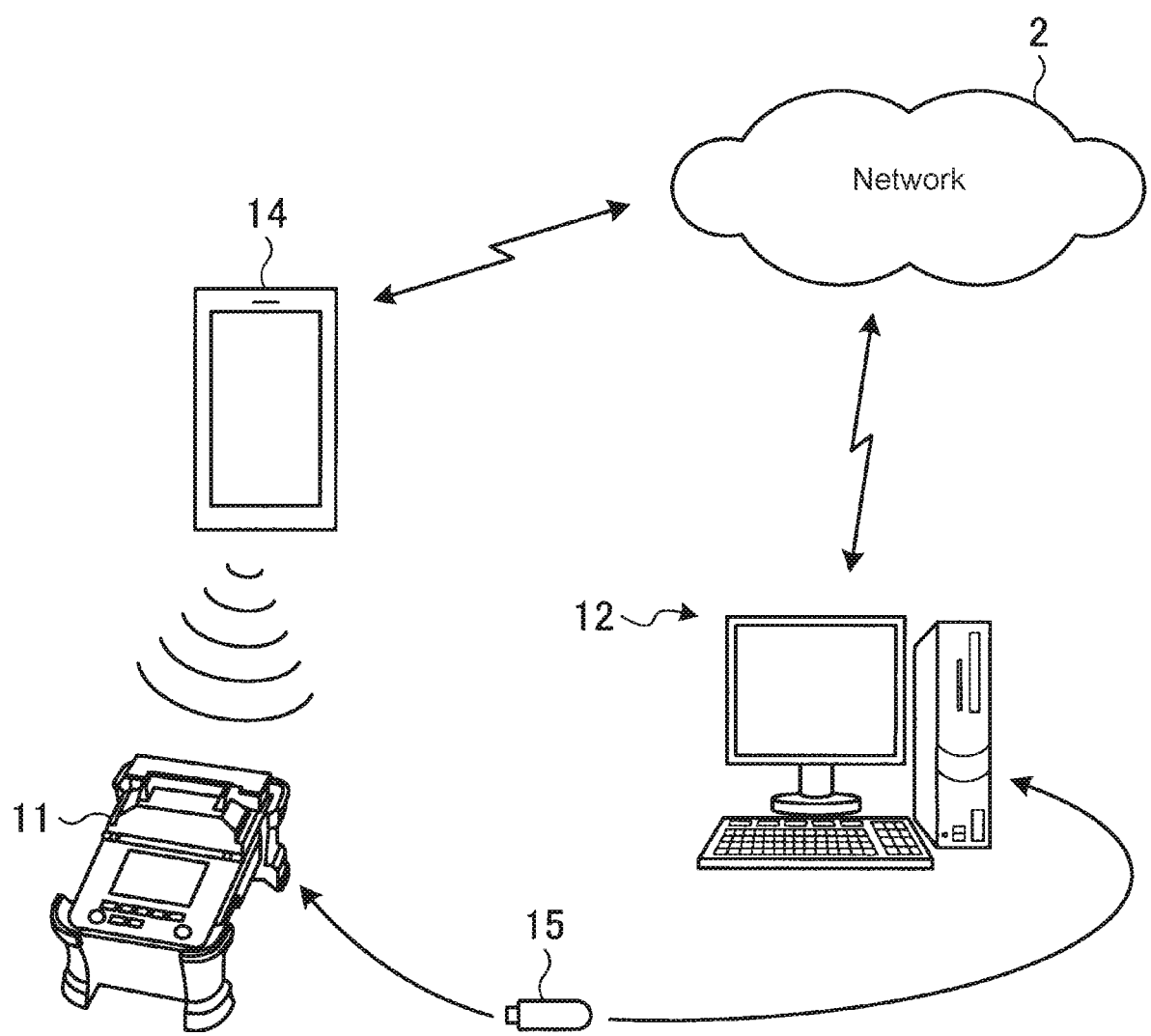
FIG. 6 is a view of one modification example of a user-side communication unit in the embodiment of the present invention.

FIG. 6 illustrates one modification example of the user-side communication unit in the embodiment of the present invention. As shown in FIG. 6, for example, the user-side communication unit of the present invention may be a portable information terminal 14 such as a smartphone or tablet personal computer that has various types of functions such as a network communication function. In such case, in the fusion condition providing system 1, the portable information terminal 14 is used instead of the user-side communication terminal 12, and a prescribed application for providing functions that are similar to functions of the user-side communication terminal 12 described above (communication functions and data processing functions, etc.) is installed on the portable information terminal 14. The portable information terminal 14, similar to the user-side communication terminal 12 described above, requests the fusion condition via the network 2, and thereby acquires the parameter set serving as the fusion condition requested by the user. This type of parameter set is provided to the user's fusion splicer 11 from the portable information terminal 14 via wireless communication (transmission of a wireless signal).

Furthermore, the providing of the fusion condition (parameter set) requested by the user to the fusion splicer 11 is not limited to being performed by wired communication from the user-side communication terminal 12 described above or wireless communication from the portable information terminal 14, but may be performed by using a portable storage medium 15 such as a USB memory, as shown in FIG. 6, for example. In other words, in the present invention, the fusion condition requested by the user is provided to the user's fusion splicer 11 via signal transmission or a storage medium from the user-side communication unit.

The user-side communication unit of the present invention is also not limited to being a separate device from the fusion splicer 11, such as is illustratively indicated by the user-side communication terminal 12 or portable information terminal 14 described above. In other words, in the present invention, the user-side communication unit may be a communication function unit incorporated into the fusion splicer 11. In such case, the fusion condition (parameter set) requested by the user that is transmitted to the communication function unit via the network 2 may be provided to the fusion splicer 11 by signal transmission from the communication function unit via internal wiring or the like.

In the embodiment described above, the request information for requesting the fusion condition required by the user's fusion splicer 11 to the manufacture was illustratively indicated as containing index information that indicates the types of the optical fibers desired by the user, the model of the user's fusion splicer, and the passing-light wavelength desired by the user, but the present invention is not limited to this. In the present invention, the request information regarding the fusion condition may include index information that indicates at least the types of the optical fibers desired by the user and the model of the user's fusion splicer. The data management device 41 may acquire at least the types of the optical fibers desired by the user and the model of the user's fusion splicer indicated in the index information of the request information received from the user-side communication unit via the network 2. In such case, the index information may include but need not include the passing-light wavelength desired by the user.

In the present invention, the request information regarding the fusion condition may include index information indicating at least the types of the optical fibers desired by the user. The data management device 41 may request the model of the user's fusion splicer 11 to the user-side communication unit (the user-side communication terminal 12 or portable information terminal 14, etc.) via the network 2 to acquire the model of the user's fusion splicer 11 from the user-side communication unit. Furthermore, the data management device 41 may acquire at least the types of the optical fibers desired by the user indicated in the index information of the request information received from the user-side communication unit via the network 2. In such case, the index information may include but need not include the passing-light wavelength desired by the user.

Moreover, although the fusion condition of the optical fibers generally depends on the passing-light wavelength, often, the passing-light wavelength of the optical fibers after fusion splicing is uniquely determined based on the combination of the optical fibers to be fusion spliced. In such a case, the passing-light wavelength desired by the user need not be included in the index information, and need not be included in the information associated with the parameter set (the fusion condition of the optical fibers).

In the embodiment described above, the data management device searched for the fusion condition corresponding to the request information received from the user-side communication unit via the network as the fusion condition requested by the user from the plurality of fusion conditions inside the storage device, but the present invention is not limited to this. In the present invention, the search process of the fusion condition requested by the user may be executed by the data management device as described above, or the user-side communication unit may be provided with a data search process function, with the search process executed by the user-side communication unit. Furthermore, the user-side communication unit may have a memory unit that serves as a local database for fusion conditions (although it may be small in size relative to the database 42a in the storage device 42). Such a memory unit stores a plurality of popular fusion conditions for certain popular pairs of optical fibers in advance or may store and accumulate fusion conditions each time the fusion condition is retrieved from the data management device through the processes explained with reference to FIG. 5 above. In this case, when a user requests a fusion condition that was not in the fusion splicer 11, for example, the user-side communication unit may search for the requested condition in its own database first, and if the requested fusion condition is not found in its local database, the user-side communication unit communicates with the data management device to initiate the procedure depicted in FIG. 5 above. The resultant newly obtained fusion condition may be then stored in the local database at the user-communication unit for future use. This way, the local database in the user-communication unit can be updated or supplemented.

The data management device may receive the request information from the user-side communication unit via the network and, in accordance with the received request information, transmit at least one fusion condition among the plurality of fusion conditions inside the storage device to the user-side communication unit via the network. Among the at least one of the fusion conditions transmitted to the user-side communication unit, the fusion condition requested by the user may be provided to the user's fusion splicer from the user-side communication unit via signal transmission or a storage medium. At such time, the at least one of the fusion conditions transmitted to the user-side communication unit may be the fusion condition requested by the user that has been searched and retrieved by the data management device from the plurality of fusion conditions inside the storage device as described above. The user-side communication unit may receive the at least one of the fusion conditions from the data management device via the network and search for, as the fusion condition requested by the user, the fusion condition corresponding to the request information from the at least one of the fusion conditions that has been received to obtain the fusion condition requested by the user. In other words, among the at least one of the fusion conditions transmitted to the user-side communication unit, the fusion condition requested by the user that is provided to the user's fusion splicer may be obtained by being searched by the user-side communication unit from the at least one of the fusion conditions.

Furthermore, in the embodiment described above, the data management device determined whether the fusion condition requested by the user was present in the plurality of fusion conditions stored in the storage device, and if the fusion condition requested by the user was present, the data management device transmitted the fusion condition requested by the user that was searched and retrieved from the plurality of fusion conditions to the user-side communication unit via the network, but the present invention is not limited to this. If the fusion condition requested by the user is present in the plurality of fusion conditions stored in the storage device, then the data management device may transmit the at least one of the fusion conditions that includes the fusion condition requested by the user among the plurality of fusion conditions to the user-side communication unit via the network. In such case, the user-side communication unit may search for and obtain the fusion condition corresponding to the request information from the at least one of the fusion conditions received from the data management device as the fusion condition requested by the user.

Moreover, in the embodiment described above, if the fusion condition requested by the user was absent in the plurality of fusion conditions stored in the storage device, the data management device transmitted a new fusion condition corresponding to the creation instruction information described above to the user-side communication unit as the fusion condition requested by the user, but the present invention is not limited to this. If the fusion condition requested by the user is absent, the data management device may include the new fusion condition corresponding to the creation instruction information described above as the fusion condition requested by the user in the at least one fusion condition transmitted to the user-side communication unit among the plurality of fusion conditions. In other words, among the plurality of fusion conditions, the data management device may transmit the at least one of the fusion conditions including the new fusion condition as the fusion condition requested by the user to the user-side communication unit via the network. The user-side communication unit may execute the search process for the fusion condition requested by the user on the at least one of the fusion conditions that has been transmitted in this manner.

Furthermore, in the embodiment described above, if it was determined that the fusion condition requested by the user was absent in the fusion condition database 42a inside the storage device 42 on the basis of the result of the search process for the fusion condition in step S102 shown in FIG.

5, then it was confirmed whether the two optical fibers required for creation of the fusion condition requested by the user were in the optical fiber collection center 30, and creation instructions for the fusion condition requested by the user were performed, but the present invention is not limited to this. In the present invention, if the fusion condition requested by the user is absent as described above, then creation instructions for the fusion condition requested by the user may be performed without confirming the presence/absence of the optical fibers in the optical fiber collection center 30. In other words, if step S103 in FIG. 5 is "No," then step S114 may be performed without performing the processes of steps S104 to S113, and then the processes of step S114 onward may be performed, or step S104 and step S105 may be performed, after which step S114 is performed without performing the processes of steps S106 to S113, and then the processes of step S114 onward may be performed.

Moreover, in the embodiment described above, the new data management device 21, optical fiber management device 31, and data management device 41 performed various types of processes such as communication via the network 2, but the present invention is not limited to this. In the present invention, at least one of the new data management device 21 and optical fiber management device 31 may be disposed inside the same area as the data management device 41. In such case, the data management device 41 and at least one of the new data management device 21 and optical fiber management device 31 may perform communication not via the network 2 but rather via a communication cable or a wireless antenna or the like in the same area, and the various types of data or information such as the parameter set or instruction information described above may be transmitted and received thereby.

Furthermore, in the embodiment described above, a case was illustratively indicated in which the required optical fiber number for creation of the new parameter set corresponding to the requests by the user was two, but the present invention is not limited to this. In the present invention, if one of the optical fibers among the two optical fibers used for creation of the new parameter set is already present, then the required optical fiber number may be one. In other words, the required optical fiber number may be the number of optical fibers that is insufficient for creation of the new parameter set (insufficient number).

Moreover, in the embodiment described above, the types of the optical fibers collected in the optical fiber collection center 30 were managed by the optical fiber management device 31, but the present invention is not limited to this. In the present invention, the optical fiber management device 31 may manage the types of the optical fibers for creation of the new parameter set in addition to the types of the optical fibers collected in the optical fiber collection center 30. In other words, the optical fiber management device 31 may manage the types of the plurality of optical fibers used for creation of the new parameter sets in the fusion condition providing system 1.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

INDUSTRIAL APPLICABILITY

As described above, the fusion condition providing system according to the present invention is useful for fusion splicing of optical fibers by a fusion splicer and is particularly suited to providing, as quickly as possible to the user's fusion splicer, a parameter set required for fusion splicing the optical fibers desired by the user.

What is claimed is:

1. A fusion condition providing system that provides fusion conditions to a fusion splicer that fusion splices optical fibers, the fusion condition providing system comprising:
    a user-side communication terminal that generates a command for requesting a fusion condition for a pair of optical fibers to be fusion spliced by the fusion splicer, the user-side communication terminal transmitting said command via a network;
    a storage device storing a database of a plurality of fusion conditions;
    a first computer having a first processor, connected to the network, the first processor of the first computer being configured to create and manage a new fusion condition that is not in the storage device; and
    a second computer having a second processor, the second processor of the second computer being configured to control the storage device and to communicate with the user-side communication terminal via the network,
    wherein the storage device, the first computer, and the second computer are remotely located from the user-side communication terminal and the fusion splicer, and are accessible only through the network via the user-side communication terminal, and
    wherein when the second computer receives said command for requesting the fusion condition via the network, the storage device is searched for the fusion condition requested by the user-side communication terminal, and if the requested fusion condition exists among the plurality of fusion conditions stored in the storage device, the second computer retrieves the requested fusion condition from the storage device and transmits the retrieved requested fusion condition to the user-side communication terminal via the network so that the retrieved requested fusion condition is provided to the fusion splicer,
    wherein, if the requested fusion condition does not exist among the plurality of fusion conditions stored in the storage device, the second computer transmits a request to newly create the requested fusion condition to the first computer,
    wherein in response to the request to newly create the requested fusion condition, the first computer causes the requested fusion condition to be newly created and transmits the newly created fusion condition to the second computer,
    wherein upon receipt of the newly created fusion condition, the second computer stores the newly created fusion condition in the storage device so as to update the database of the fusion conditions in the storage device, and transmits the newly created fusion condition to the user-side communication terminal via the network so that the newly created fusion condition is provided to the fusion splicer, and
    wherein the command for requesting the fusion condition includes index information, the index information including first optical fiber identifying information that identifies a type of one of the pair of optical fibers, second optical fiber identifying information that identifies a type of another of the pair of optical fibers, passing-light wavelength information that indicates an operating wavelength that is a wavelength of light passing through the optical fibers after fusion splicing, and fusion splicer identifying information that identifies a model of the fusion splicer.

2. The fusion condition providing system according to claim 1, wherein the user-side communication terminal performs the search for the requested fusion condition in the storage device by accessing the storage device via the network, and if the requested fusion condition exists among the plurality of fusion conditions stored in the storage device, the user-side communication terminal causes the second computer to retrieve the requested fusion condition from the storage device and transmit the retrieved requested fusion condition to the user-side communication terminal via the network so that the retrieved requested fusion condition is provided to the fusion splicer.

3. The fusion condition providing system according to claim 1, wherein each fusion condition is a parameter set that is associated with at least the types of the optical fibers to be fusion spliced and the model of the fusion splicer to be used for the fusion splicing.

4. The fusion condition providing system according to claim 3, wherein each fusion condition is further associated with the operating wavelength that is the wavelength of the light passing through the optical fibers after the fusion splicing.

5. The fusion condition providing system according to claim 1,
wherein the user-side communication terminal, the first computer, and the second computer are located remotely from each other and are connected through the network that includes a shared public network.

6. The fusion condition providing system according to claim 1, further comprising:
a third computer having a third processor, the third processor of the third computer being configured to manage a plurality of optical fibers that are available for use in newly creating the requested fusion condition by the first computer,
wherein the second computer determines whether the requested fusion condition exists in the plurality of fusion conditions stored in the storage device, and if the requested fusion condition does not exist among the plurality of fusion conditions stored in the storage device, the second computer communicates with the third computer, and determines whether the third computer indicates that said pair of optical fibers for which the requested fusion condition is to be newly created are available for use, and
wherein if the third computer does not indicate that said pair of optical fibers are available for use, the second computer transmits a request to the third computer that causes said pair of optical fibers to be available for use in newly creating the requested fusion condition, and
wherein, only after confirming that the third computer indicates that said pair of optical fibers are available for use in newly creating the requested fusion condition, the second computer transmits the request to newly create the requested fusion condition to the first computer.

7. The fusion condition providing system according to claim 1, wherein the user-side communication terminal includes a storage unit that serves as a local database for fusion conditions, storing a plurality of fusion conditions, and when a user requests a fusion condition to the user-side communication terminal, the user-side communication terminal first searches the local database for the requested fusion condition and only when the local database does not contain the requested fusion condition, the user-side communication terminal generates said command for requesting said fusion condition,
wherein when the user-side communication terminal receives the retrieved requested fusion condition from the second data management computer, the user-side communication terminal updates the local database by adding the retrieved requested fusion condition to the local database, and
wherein when the user-side communication terminal receives the newly created fusion condition from the second computer, the user-side communication terminal updates the local database by adding the newly created fusion condition to the local database.

8. A fusion condition server to be installed in a fusion condition providing network system that provides fusion conditions to a fusion splicer that fusion splices optical fibers, the fusion condition server being connected to a network and comprising:
a storage device that stores a database of a plurality of fusion conditions; and
a first computer having a first processor that controls the storage device,
wherein the first computer is configured to receive, via the network, a command generated by a user-side communication terminal that is connectable or connected to the fusion splicer, said command requesting a fusion condition for a pair of optical fibers to be fusion spliced by the fusion splicer,
wherein the fusion condition server is remotely located from the user-side communication terminal and the fusion splicer, and are accessible only through the network via the user-side communication terminal, and
wherein in response to said command, the first computer performs a search for the requested fusion condition in the storage device, and if the requested fusion condition exists among the plurality of fusion conditions stored in the storage device, the first computer retrieves the requested fusion condition from the storage device and transmits the retrieved requested fusion condition to the user-side communication terminal via the network so that the retrieved requested fusion condition is provided to the fusion splicer,
wherein, if the requested fusion condition does not exist among the plurality of fusion conditions stored in the storage device, the first computer transmits a new condition request to newly create the requested fusion condition to a second computer that is disposed in the fusion condition providing network system, and
wherein the first is configured to receive the fusion condition that has been newly created by the second computer in response to the new condition request, and store the newly created fusion condition in the storage device so as to update the database of the fusion conditions in the storage device, and the first computer further transmits the newly created fusion condition to the user-side communication terminal via the network so that the newly created requested fusion condition is provided to the fusion splicer, and
wherein the command for requesting the fusion condition includes index information, the index information including first optical fiber identifying information that identifies a type of one of the pair of optical fibers, second optical fiber identifying information that identifies a type of another of the pair of optical fibers, passing-light wavelength information that indicates an operating wavelength that is a wavelength of light passing through the optical fibers after fusion splicing, and fusion splicer identifying information that identifies a model of the fusion splicer.

9. The fusion condition server according to claim 8, wherein each fusion condition is a parameter set that is associated with at least the types of the optical fibers to be fusion spliced and the model of the fusion splicer to be used for the fusion splicing.

10. The fusion condition server according to claim 9, wherein each fusion condition is further associated with the operating wavelength that is the wavelength of the light passing through the optical fibers after the fusion splicing.

11. The fusion condition server according to claim 8,
wherein if the requested fusion condition does not exist among the plurality of fusion conditions stored in the storage device, the first computer communicates with a third computer in the fusion condition providing network system that manages a plurality of optical fibers that are available for use in newly creating the requested fusion condition by the second computer, and determines whether the third computer indicates that said pair of optical fibers for which the requested fusion condition is to be newly created are available for use, and wherein if the third optical fiber management computer does not indicate that said pair of optical fibers are available for use, the first data management computer transmits a request to the third computer that causes said pair of optical fibers to be available for use in newly creating the requested fusion condition, and wherein, only after confirming that the third computer indicates that said pair of optical fibers are available for use in newly creating the requested fusion condition, the first computer transmits the request to newly create the requested fusion condition to the second computer.

* * * * *